United States Patent [19]
Baca

[11] Patent Number: 5,826,374
[45] Date of Patent: Oct. 27, 1998

[54] HYDROPONIC GARDEN APPARATUS

[76] Inventor: Brian A. Baca, 1001 San Mateo SE, Albuquerque, N. Mex. 87108

[21] Appl. No.: 665,324

[22] Filed: Jun. 17, 1996

[51] Int. Cl.$^6$ .................................................... A01G 31/00
[52] U.S. Cl. .................................................... 47/62; 47/60
[58] Field of Search .................................. 47/59, 60, 62, 47/79, 81

[56] References Cited

U.S. PATENT DOCUMENTS

| | | | |
|---|---|---|---|
| 3,108,400 | 10/1963 | Wolfe, Jr. | |
| 3,300,895 | 1/1967 | Dosedla et al. | 47/62 C |
| 3,542,069 | 11/1970 | Ollison | |
| 4,106,235 | 8/1978 | Smith | 47/79 X |
| 4,118,891 | 10/1978 | Kehl et al. | 47/62 C X |
| 4,177,604 | 12/1979 | Friesen | 47/62 |
| 4,332,105 | 6/1982 | Nir | 47/62 A X |
| 4,447,983 | 5/1984 | Shinada | 47/48.5 |
| 4,951,416 | 8/1990 | Gutridge | 47/62 |
| 5,251,399 | 10/1993 | Ramussen | 47/39 |
| 5,501,037 | 3/1996 | Aldokimov et al. | 47/59 X |

FOREIGN PATENT DOCUMENTS

| | | | |
|---|---|---|---|
| 179703 | 12/1935 | Switzerland | 47/79 |
| 17940 | 10/1904 | United Kingdom | 47/79 |
| 2213034 | 8/1989 | United Kingdom | 47/59 |

OTHER PUBLICATIONS

"The Living System" Brochure, copy attached, author & date unknown.

"Multiflow Hydroponic Systems" Flier, copy attached, author & date unknown.

*Primary Examiner*—John A. Ricci
*Attorney, Agent, or Firm*—Mark A. Rogers; Gary N. Speed; Mark M. Henry

[57] ABSTRACT

Automated hydroponic plant growing apparatus, for providing an equal supply of nutrient solution, at a controlled rate, to plants in each of a plurality of individual growth chambers, with provision of flow irrigation of each plant in each chamber. The apparatus provides for fully powered, pressurized flow of nutrient solution through separate lines to each growth chamber, and provides for automatic maintenance of equal levels of nutrient solution in the various chambers of the system, having return flow lines for return of any excess accumulation of nutrient solution from any one growth chamber to the central distribution chamber. Through provision of pressurized flow of nutrient solution to the growth chambers, the system avoids any need to rely even in part on gravity flow of nutrient solution, and so may be used with all components located on a single level, e.g. all resting on a common floor. A Timer controls the pump which pressurizes the nutrient solution flow to the growth chambers, so that nutrient solution will be provided to all of the plants at a desired rate. Return flow lines surround and enclose the lines for flow of nutrient solution to the growth chambers, so as to halve the line clutter associated with these lines.

16 Claims, 4 Drawing Sheets

HYDROPONIC GARDEN APPARATUS

BACKGROUND OF THE INVENTION

The invention pertains to hydroponic plant growth systems, for providing nutrient solution to plants in a plurality of growth chambers, and more particularly to apparatus for accomplishing this function automatically, in such manner as to provide uniformity of nourishment to the plants in the various growth chambers.

As detailed in applicant's Information Disclosure Statement and documents filed therewith, a variety of systems are known for providing hydroponic nutrient solution or water to plants in a plurality of growth chambers. However, some of these systems rely at least in part on gravity flow of nutrient solution, thus requiring that different components of the system be located on different levels. There is thus a need, met by the present invention, for a system not relying at all on gravity flow of nutrient solution to or from the growth chambers, and instead providing for fully powered pressurized flow of nutrient solution to the various growth chambers, so that the system may be used with all components on a single level, e.g. resting simply on a single floor.

As also shown in applicant's Information Disclosure Statement and accompanying items, some systems for distribution of hydroponic nutrient solution, while providing for distribution of nutrient solution to each of the growth chambers, do so in a manner which does not provide for uniformity of nourishment of the various plants, either by having the nutrient solution flow sequentially through the various growth chambers, so that the nutrient solution reaching growth chambers which are further down in the flow sequence will have a poorer nutrient supply remaining, as compared with that reaching chambers higher up in the flow sequence, due to absorption of a portion of the nutrient in the higher chambers; or by having a common main flow line from which streams flow out to the various chambers, so that, due to the resulting pressure drop along the flow line, the plants in chambers further downstream on the common main flow line will receive a smaller flow rate of nutrient solution than those in chambers further upstream on the flow line. So there is a need, also met by the present invention, for a system in which separate, identical pressurized flow lines, one for each growth chamber, provide completely equal flow of nutrient solution to the various growth chambers.

There is also a need for such a system as applicant's which will also automatically maintain equal levels of nutrient solution in the various growth chambers, to further facilitate the provision of equal nourishment to the plants in each of the growth chambers. For this purpose there is a need for provision of return flow line means, to allow return of excess nutrient solution from any one growth chamber, to the central distribution chamber, when an excess amount of nutrient solution accumulates in said growth chamber, above the level which is to be maintained in the various growth chambers.

And since the applicant's system provides separate flow lines to convey nutrient solution to each of the growth chambers, as well as providing a return flow line to return excess nutrient solution from each growth chamber, there is also a need to minimize the clutter of numerous lines which can thus be present where a significant number of growth chambers are used. Applicant's invention meets this need, halving the clutter of nutrient solution flow lines going to and from the growth chambers, by having each return flow line surround and thus enclose a line conveying nutrient solution to the same growth chamber.

SUMMARY OF THE INVENTION

The invention is an automated apparatus for hydroponically growing plants in a plurality of growth chambers, having conveyance means to convey nutrient solution under powered pressure separately to each of said growth chambers, as further detailed below; flow irrigation means in each of said growth chambers, connected to said conveyance means, for flow irrigation of said plants in said growth chamber; root catch means, in each of said growth chambers, for preventing roots from said plants from interfering with flow of nutrient solution to and away from said plants; reservoir means, for holding nutrient solution prior to distribution to said growth chambers; distribution chamber means, connected to said reservoir means and separately to each of said growth chambers, for distributing the nutrient solution under pressure to the growth chambers; nutrient solution level setting means, for setting a desired level of the nutrient solution in each of the growth chambers; return flow means for each growth chamber, connecting said growth chamber to the distribution chamber means, and surrounding the portion of the conveyance means which conveys nutrient solution to said growth chamber, for returning a portion of the nutrient solution from said growth chamber to the distribution chamber means, when the level of nutrient solution in said growth chamber rises above the desired level; and timing means, for timing cycles of operation of the distribution means to achieve a desired average rate of flow of nutrient solution to the growth chambers.

In the preferred embodiment, Each growth chamber comprises three nested buckets, with the lower bucket first receiving tubing conveying nutrient solution from the conveyance means; the middle bucket serving as the root catcher means, to prevent plant roots from intruding into the lower bucket, and having drainage holes for return flow of nutrient solution; and an upper bucket holding the plant and media, and having drainage holes for return flow of nutrient solution. Tubing conveys nutrient solution from the lower bucket, through holes in the two upper buckets and through the media to a flow ring at the top of the plant, thus forming the flow irrigation means, with nutrient solution returning to the lower bucket through the drainage holes in the two upper buckets. A reservoir having an upper chamber for initially receiving nutrient solution, is connected by tubing to a float valve in a lower chamber, where the float valve establishes the desired level of nutrient solution; the lower chamber is connected by tubing to a distribution chamber holding nutrient solution for distribution to the growing chambers. A submersible water pump within the nutrient solution in the distribution chamber, pumps nutrient solution through an adjacent water distributor, to tubes leading to each of the growth chambers, which tubes are surrounded by larger diameter return flow tubes to return excess nutrient solution to the distribution chamber from the growth chambers when the level of nutrient solution in a growth chamber exceeds the desired level. The application of electric power to the pump is controlled by a timer, so that nutrient solution may be distributed to the growth chambers at desired times.

BRIEF DESCRIPTION OF THE DRAWINGS

All of the drawings pertain to the same preferred embodiment of the invention.

DETAILED DESCRIPTION OF THE PREFERRED EMBODIMENT

Figure 1:
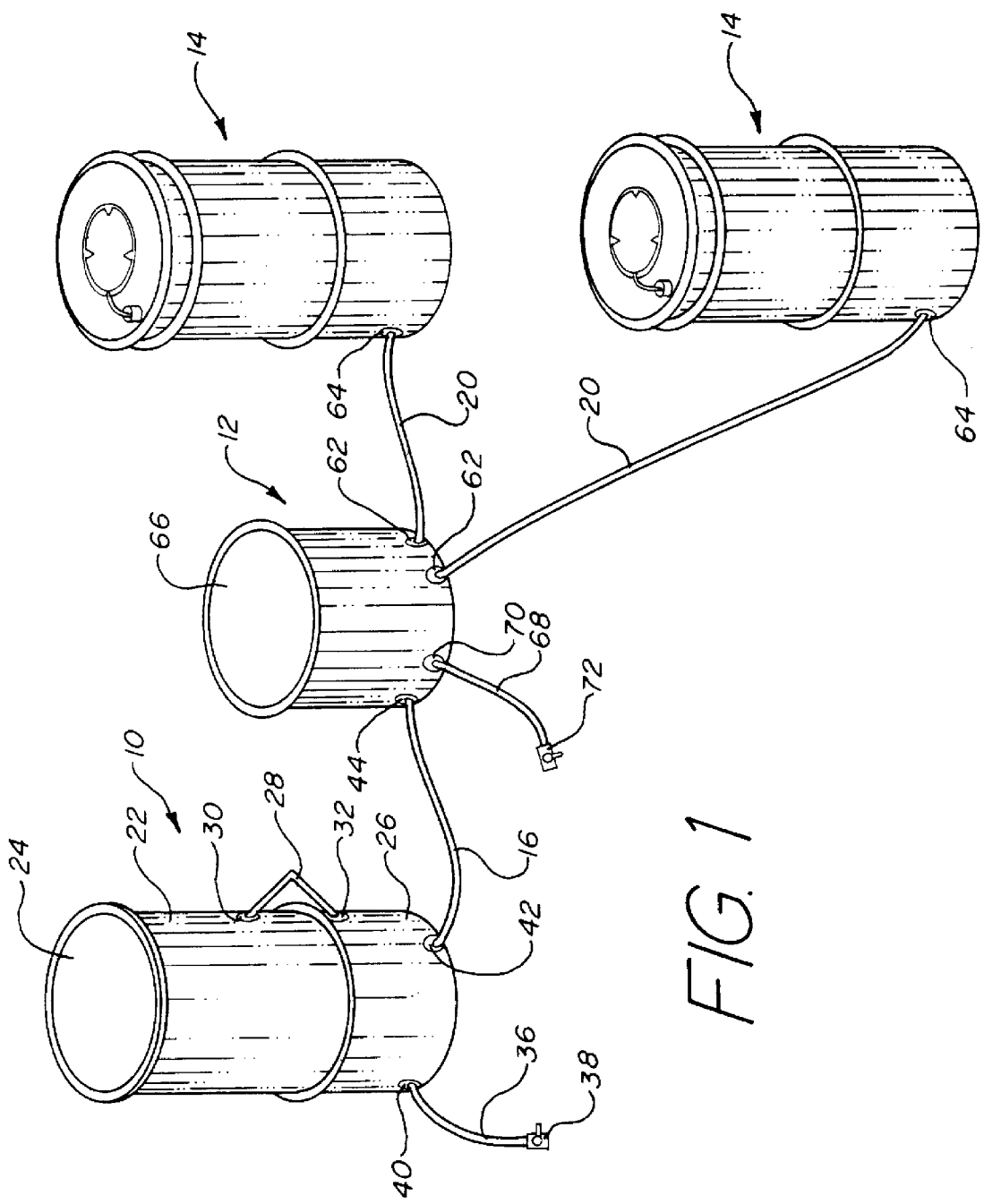
FIG. 1 is a perspective view of the preferred embodiment.
Figure 2:
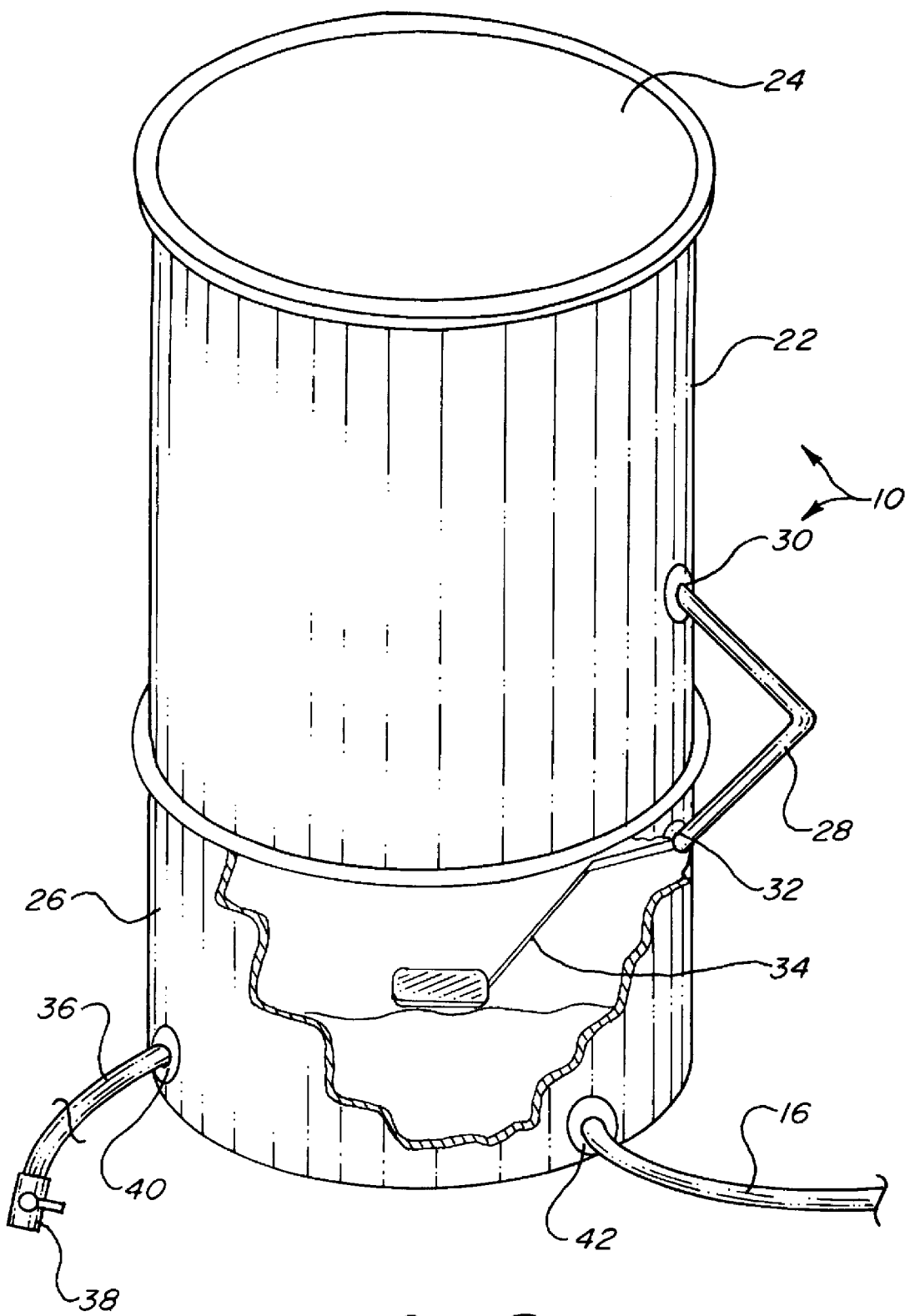
FIG. 2 is a perspective view, partially in cut away, of the nutrient solution reservoir.
Figure 3:
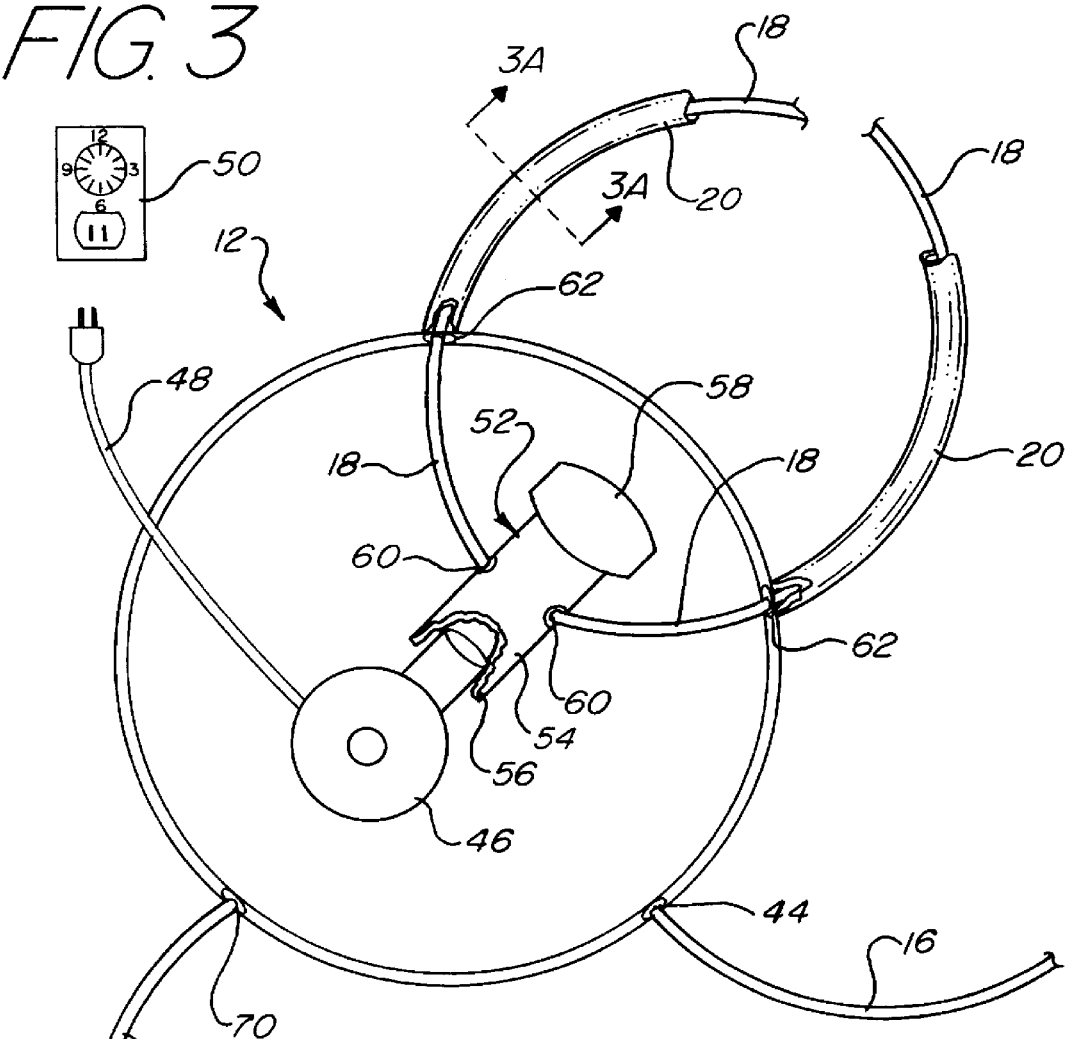
FIG. 3 is a plan view, partially in cut away, of the nutrient solution distribution chamber and associated components, with the lid of the distribution chamber removed.
Figure 3A:
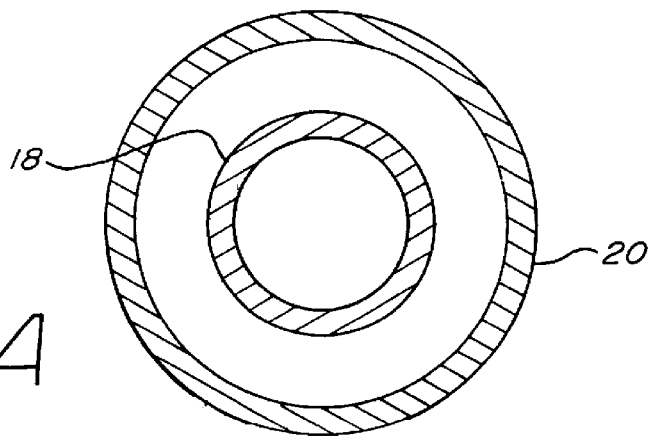
FIG. 3A is a sectional view of a pumping tube and surrounding return flow tube, for the sectional view indicated by the section line 3A—3A in FIG. 3.

Referring now to the drawings, in which like reference numbers denote like or corresponding elements, the principal components of the apparatus are a nutrient solution reservoir 10, a nutrient solution distribution chamber 12 containing a pumping and nutrient solution distribution mechanism detailed below, and a plurality of growth chambers 14 in which the growing plants are housed. The nutrient solution flows from reservoir 10 to distribution chamber 12 via a reservoir output tube 16, and from distribution chamber 12 to each growth chambers 14 via a pumping tube 18; pumping tube 18 being surrounded by a larger return flow tube 20 which conveys any excess nutrient solution from growth chamber 14 back to distribution chamber 12. The various pumping tubes 18 are of equal length, for uniformity of the rate of conveyance of nutrient solution to the various growth chambers 14.

The reservoir 10 has two parts: an upper 5 gallon bucket 22, with a lid 24, for initial deposit of nutrient solution by the user of the apparatus upon lifting of lid 24, and a lower 3.5 gallon bucket 26. A ½ inch I.D. tube 28 conveys nutrient solution out of bucket 22, through a hole 30 on one side near the bottom of bucket 22, and through a hole 32 in the side of bucket 26, to a conventional float valve 34 within bucket 26, which float valve 34 is set to stop the flow of nutrient solution into bucket 26 when the nutrient solution reaches a desired nutrient solution level within bucket 26. When the nutrient solution level falls below this level, the float valve 34 will admit additional nutrient solution into bucket 26, so as to maintain the desired level of nutrient solution. The reservoir 10 may be drained when needed, by means of a ½" I.D. drain tube 36, having a ½" water shut off valve 38 mounted in drain tube 36, with drain tube 36 being connected to the side of the base of reservoir 10 at a ½" hole 40, with draining being initiated by opening shut off valve 38.

The distribution chamber 12 receives nutrient solution from reservoir 10 through the reservoir output tube 16 which runs from a hole 42 in the bottom of the side of bucket 26 into a hole 44 in the bottom of the side of distribution chamber 12. Inside of distribution chamber 12 is a submersible electrically powered nutrient solution pump 46, which is a conventional submersible water pump, connected by a power cord 48 to a conventional timer 50 which plugs into a standard household power outlet, so that timer 50 may be used to cause pump 46 to operate at desired times. The pump 46, which is operated below the level of the nutrient solution, pumps nutrient solution into a nutrient solution distributor 52. The nutrient solution distributor 52 comprises a ½" I.D. tube 54, open at one end 56 where it attaches to pump 46 and receives nutrient solution pumped by pump 46, and capped at the other end by an end cap 58. Along the sides of the tube 54 are a plurality of outlet holes in brass grommets 60, one for each of the plurality of growth chambers 14. To each of the grommets 60 is attached a ¼" pumping tube 18. However, in the embodiment actually fabricated by applicant, a slightly different arrangement is used: a ³⁄₁₆" tube (not shown) is connected to each grommet 60, and said ³⁄₁₆" tube is then connected to the corresponding ¼" pumping tube 18 via a hollow straight connector (not shown); but this difference of detail is not believed to be relevant to the functioning of the system. The pumping tube 18 runs from the grommet 60, out of distribution chamber 12 through a hole 62 near the bottom of one side of distribution chamber 12, and thence to the corresponding growth chamber 14. Between the distribution chamber 12, and the growth chamber 14, each pumping tube 18 is surrounded by a larger hollow return flow tube 20 of ½" I.D., allowing return flow of nutrient solution, with return flow tube 20 connected to hole 62 in the base of distribution chamber 12, and to a hole 64 in the bottom side of growth chamber 14. The distribution chamber 12 has a lid 66, and also has a ½" I.D. drain tube 68, connected to a ½" hole 70 in the side of the base of distribution chamber 12, and having a ½" water shut off valve 72 mounted in drain tube 68, for use when it is needed to drain distribution chamber 12, as when cleaning the system, or when it is needed to move the system, with such draining being done by opening shut off valve 72.

Each of the growth chambers 14 is a nested structure of three buckets, with the lower bucket 74 containing both the middle bucket 76 and the smallest, upper bucket 78, which latter bucket 78 contains the plant and media 80. The bottom portion of lower bucket 74 acts as a portion of a growth chamber reservoir for nutrient solution flowing back down from the two higher buckets, and the middle bucket 76 acts as a root catch, to keep roots from the plants from intruding into the reservoir of bucket 74 and thus interfering with flow of nutrient solution, and also provides an additional portion of the growth chamber nutrient solution reservoir space, when the nutrient solution level is above the bottom of middle bucket 76, as it normally will be. The pumping tube 18 passes through a hole 82 on the side at the bottom of bucket 76, and thence through a PVC pipe 84, which fits through a hole 86 in the bottom of bucket 78. The PVC pipe 84 conveys pumping tube 18 up through the plant media 80 in bucket 78, to the top 88, where pumping tube 18 is attached by a ½" T 90 to a conventional flow ring 92 surrounding the plant at the top of the plant media 80, whereby the plant may be flow irrigated with nutrient solution conveyed to flow ring 92 from distribution chamber 12 by pumping tube 18. The bucket 78 has eleven holes 94 drilled through the bottom thereof, and the bucket 76 has three or more holes 96 in the bottom at the side thereof. The holes 94 and 96 in the bottoms of bucket 78 and bucket 76, respectively, allow nutrient solution to flow back to the reservoir section in the base of bucket 74, after flowing from the flow ring 92 and through the plant media 80 in bucket 78. Although some of the plant roots may extend into the bottom portion of bucket 76 through the holes 94, the bucket 76 will prevent these roots from extending further into the reservoir section, in the bottom of bucket 74. Thus bucket 76 acts as a root catcher, which prevents the roots from interfering with return flow of nutrient solution from the bottom reservoir in the base of bucket 74.

Figure 4:
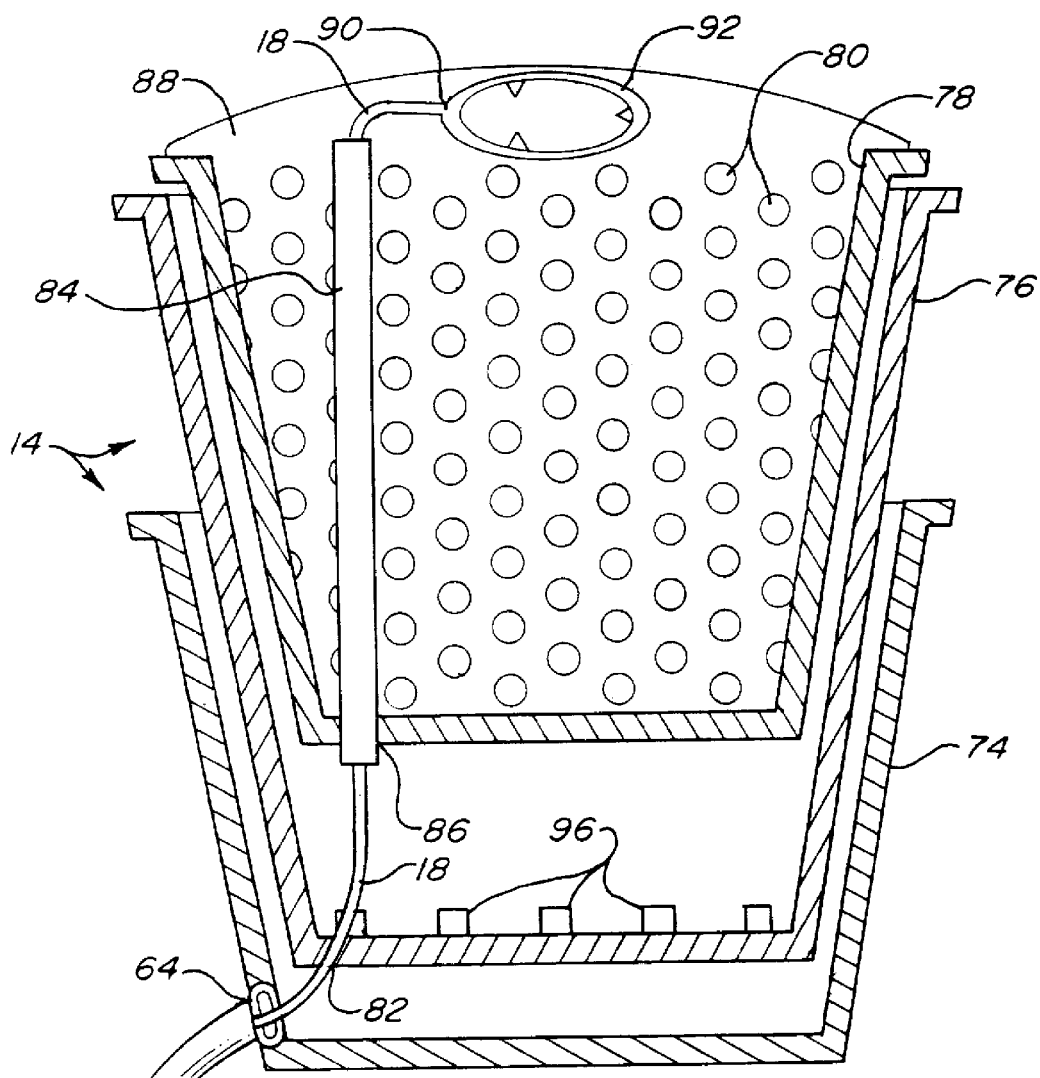
FIG. 4 is a cut away view of one of the growth chambers.
Figure 4A:
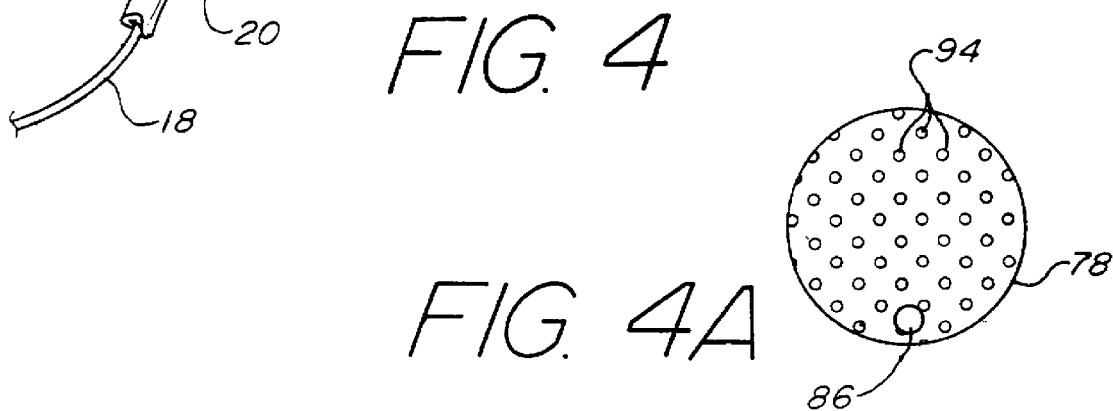
FIG. 4A is a plan view of the upper bucket of the growth chamber.

As indicated in FIG. 4, the upper portion of middle bucket 76 has a diameter larger than the maximum inside diameter of lower bucket 74, so that the bottom of middle bucket 76 will be held up off the bottom of bucket 74, to provide a portion of the growth chamber reservoir space, in the bottom of bucket 74, with the remainder of said reservoir space being in the bottom of the middle bucket 76.

Operation of the system is quite simple and straightforward, requiring only minimal actions by the owner, who must of course periodically, as needed, replenish the nutrient solution by adding the same to bucket 22 at the top of reservoir 10, after raising lid 24. The operator must of course also set the timer 50 so that the pump 46 will operate on the desired schedule. When the pump 46 is on, it will pump nutrient solution out through the nutrient solution distributor 52 and pumping tubes 18 at equal rates to each of the growth chambers 14, simultaneously of course drawing nutrient solution from reservoir 10 through reservoir output tube 16. When the nutrient solution level in the base bucket 26 of reservoir 10 falls below the level for which float valve 34 has been set, the float valve 34 will open and admit additional nutrient solution into bucket 26 from upper bucket 22 of reservoir 10. Because of the combined effect of float valve 34 in the bucket 26 in the base of reservoir 10, and the return flow means afforded by the return flow tubes 20, which allow any excess fluid in a particular growth chambers 14 to return to distribution chamber 12, the system will automatically act to maintain uniform levels of the nutrient solution, in the various buckets 74 of the growth chambers 14, and in the distribution chamber 12, and bucket 26 of reservoir 10. This level acts as the nutrient solution level for a collective reservoir formed by the buckets 74 of the growth chambers 14, and the distribution chamber 12, and reservoir 10.

It will be seen from the above description that the only gravity flow of nutrient solution in the entire apparatus is that occurring within each of the growth chambers 14, as nutrient solution flows downward from flow ring 92; and that the system does not depend at all upon gravity flow either to or from each of the growth chambers 14. Therefore the system may be operated with all of its chambers located on one level, as on a floor. Indeed for optimum performance the system must be operated with all components at least substantially on the same level, whether on a floor or all supported at some equal higher level. For example, if one of the growth chambers 14 were located at an elevation a foot higher than the others, it would receive a smaller flow of the nutrient solution, since it would be harder to pump the nutrient solution to the higher elevation of that one growth chamber 14.

Those familiar with the art will appreciate that the invention may be employed in configurations other than the specific forms disclosed herein, without departing from the essential substance thereof.

For example, and not by way of limitation, the various dimensions given above for various components of the preferred embodiment are convenient sizes for one particular embodiment, and are not to be regarded as limitations on the invention. Although the preferred embodiment is illustrated in the drawings as having two of the growth chambers 14, other numbers of the growth chambers 14 may of course be used instead, with a larger reservoir 10 and distribution chamber 12 as appropriate for larger numbers of growth chambers 14. Although plastic containers may conveniently be used, the apparatus is not limited to the use of any particular material, and metal or ceramic containers may be used instead, for example.

Although the invention would ordinarily be employed in a form involving a plurality of growth chambers 14, it would of course be possible to supply nutrient solution at a controlled rate to a single growth chamber 14, using an embodiment having only a single pumping tube 18 and return flow tube 20.

It would ordinarily be desirable, where a plurality of the growth chambers 14 are present, containing identical plants, to use an embodiment of the invention in which the nutrient solution is conveyed at equal rates to the various growth chambers 14, in order to achieve uniform nourishment of the various plants. To this end, such an embodiment would employ pumping tubes 18 which are at least substantially identical both as to length and inside diameter. However, if one wished to use an embodiment of the invention in which it is not necessary or appropriate to supply the nutrient solution to the various growth chambers 14 at equal rates, as for example, where different kinds of plants are located in the various growth chambers 14, one could instead employ differing pumping tubes 18, e.g. larger diameter ones for a group of plants requiring a greater rate of supply of the nutrient solution.

The invention is of course not limited as to the number of growth chambers 14 which may be employed in the system, nor as the capacities of the reservoir 10, or other system components, and the capacities of components stated above, for the preferred embodiment, are to be regarded as illustrative rather than as limitations on the scope of the invention. For example, a user might connect a 45 gallon trash receptacle to the tube 28, to have a much larger reservoir capacity than that disclosed above for the preferred embodiment.

Nor is the invention limited as to the kinds of plants which may be grown with it, or as to the kinds of plant media which might be used in the growth chambers 14, which might include, for example, grorocks, perlite or rockwool, to name a few possible media choices.

The scope of the invention is defined by the following claims, including also all subject matter encompassed by the doctrine of equivalents as applicable to the claims.

I claim:

1. Plant growth chamber, for use in growth of at least one plant in a hydroponic plant growth apparatus having at least one such plant growth chamber and having a reservoir means, for holding a nutrient solution; and having a conveyance means, connected to said reservoir means and to each of said plant growth chambers, for conveying said nutrient solution from said reservoir means to each of said plant growth chambers, and for providing flow of said nutrient solution under powered pressure to each of said plant growth chambers; said plant growth chamber comprising:

(a) a lowermost bucket, connected to said conveyance means, and having an open space at the bottom thereof constituting a portion of a growth chamber reservoir means for holding a portion of said nutrient solution in said growth chamber;

(b) a middle bucket, of a size fitting within said lowermost bucket above said open space at the bottom of said lowermost bucket, and having an open space at the bottom of said middle bucket constituting a root catcher means for holding roots from said plant without allowing said roots to extend appreciably into said lowermost bucket and also constituting the remaining portion of said growth chamber reservoir means;

(c) an upper bucket, of a size fitting within said middle bucket, containing plant media and said plant;

(d) means, connected to said conveyance means and extending to the top of said plant media in said upper bucket, for allowing flow of said nutrient solution from said conveyance means to the top of said plant media; and (e) drainage means, for allowing drainage of said nutrient solution from said upper bucket to said growth chamber reservoir means in the bottom of said lowermost bucket.

2. Hydroponic plant growth apparatus, comprising:

(a) at least one plant growth chamber;

(b) a reservoir means, for holding a nutrient solution, said reservoir means comprising an upper chamber having a lid, and a separate lower chamber having a float valve means, and wherein said upper chamber communicates by a tube leading from a hole near the bottom of the wall thereof, through a hole in the wall of said lower chamber, to said float valve means for allowing said nutrient solution to flow from said upper chamber through said tube into said lower chamber and for setting a desired level of said nutrient solution in said lower chamber;

(c) a conveyance means, connected to said reservoir means and to each of said growth chambers, for conveying said nutrient solution from said reservoir means to each of said plant growth chambers, and for providing flow of said nutrient solution under powered pressure to each of said plant growth chambers;

(d) a nutrient solution level setting and maintenance means, connected to said reservoir means, said conveyance means, and each of said plant growth chambers, for setting and maintaining a desired level of said nutrient solution in each of said plant growth chambers;

(e) an irrigation means, within each of said plant growth chambers, for irrigating of a plant present in said plant growth chamber; and (f) a timing means, connected to said conveyance means and to a source of electric power, for causing said conveyance means to convey said nutrient solution to each of said plant growth chambers at desired times.

3. Hydroponic plant growth apparatus, comprising:

(a) at least one plant growth chamber;

(b) a reservoir means, for holding a nutrient solution;

(c) a conveyance means, connected to said reservoir means and to each of said growth chambers, for conveying said nutrient solution from said reservoir means to each of said plant growth chambers, and for providing flow of said nutrient solution under powered pressure to each of said plant growth chambers;

said conveyance means comprising a distribution chamber means, connected by a reservoir output tube to said reservoir means, and connected separately by pumping tubes to each of said plant growth chambers, for distributing said nutrient solution under powered pressure at substantially equal rates to each of said plant growth chambers, and for drawing additional amounts of said nutrient solution as needed from said reservoir means through said reservoir output tube;

said distribution chamber means comprising an outer housing chamber, connected by said reservoir output tube to said reservoir means; a submersible nutrient solution pump, having an inlet and an outlet, submerged within said outer housing chamber below the level of said nutrient solution in said outer housing, and connected to a source of electric power through said timing means; and a distributor means, connected to said outlet of said pump and to each of said pumping tubes, for distributing said nutrient solution pumped by said pump to each of said plant growth chambers through said pumping tubes, said distributor means being a straight distributor tube, having an open end attached to said pump at said outlet of said pump, and having a closed opposite end of said tube, and having, one for each of said plant growth chambers, an outlet grommet projecting from a wall of said distributor tube, with said grommet inserted in one end of said pumping tube leading to said plant growth chamber;

(d) a nutrient solution level setting and maintenance means, connected to said reservoir means, said conveyance means, and each of said plant growth chambers, for setting and maintaining a desired level of said nutrient solution in each of said plant growth chambers;

(e) an irrigation means, within each of said plant growth chambers, for irrigating of a plant present in said plant growth chamber; and (f) a timing means, connected to said conveyance means and to a source of electric power, for causing said conveyance means to convey said nutrient solution to each of said plant growth chambers at desired times.

4. Hydroponic plant growth apparatus, comprising:

(a) at least one plant growth chamber;

(b) a reservoir means, for holding a nutrient solution, said reservoir means comprising an upper chamber having a lid, and a separate lower chamber having a float valve means, and wherein said upper chamber communicates by a tube leading from a hole near the bottom of the wall thereof, through a hole in the wall of said lower chamber, to said float valve means for allowing said nutrient solution to flow from said upper chamber through said tube into said lower chamber and for setting a desired level of said nutrient solution in said lower chamber;

(c) a conveyance means, connected to said reservoir means and to each of said growth chambers, for conveying said nutrient solution from said reservoir means to each of said plant growth chambers, and for providing flow of said nutrient solution under powered pressure to each of said plant growth chambers;

said conveyance means comprising a distribution chamber means, connected by a reservoir output tube to said reservoir means, and connected separately by pumping tubes to each of said plant growth chambers, for distributing said nutrient solution under powered pressure at substantially equal rates to each of said plant growth chambers, and for drawing additional amounts of said nutrient solution as needed from said reservoir means through said reservoir output tube; a return flow tube, for each of said plant growth chambers, surrounding said pumping tube and having an inside diameter larger than the outside diameter of said pumping tube, and connecting said plant growth chamber to said distribution chamber means;

(d) a nutrient solution level setting and maintenance means, connected to said reservoir means, said conveyance means, and each of said plant growth chambers, for setting and maintaining a desired level of said nutrient solution in each of said plant growth chambers, said nutrient solution level setting and maintenance means comprising, in combination, said float valve means, said reservoir output tube, said pumping tubes, and said return flow tubes;

(e) an irrigation means, within each of said plant growth chambers, for irrigating of a plant present in said plant growth chamber; and (f) a timing means, connected to said conveyance means and to a source of electric power, for causing said conveyance means to convey said nutrient solution to each of said plant growth chambers at desired times.

5. Hydroponic plant growth apparatus, comprising:
(a) at least one plant growth chamber;
(b) a reservoir means, for holding a nutrient solution;
(c) a conveyance means, connected to said reservoir means and to each of said growth chambers, for conveying said nutrient solution from said reservoir means to each of said plant growth chambers, and for providing flow of said nutrient solution under powered pressure to each of said plant growth chambers;
(d) a nutrient solution level setting and maintenance means, connected to said reservoir means, said conveyance means, and each of said plant growth chambers, for setting and maintaining a desired level of said nutrient solution in each of said plant growth chambers;
(e) an irrigation means, within each of said plant growth chambers, for irrigating of a plant present in said plant growth chamber; and
(f) a timing means, connected to said conveyance means and to a source of electric power, for causing said conveyance means to convey said nutrient solution to each of said plant growth chambers at desired times;
said plant growth chamber comprising:
a lowermost bucket, connected to said conveyance means, and having an open space at the bottom thereof constituting a portion of a growth chamber reservoir means for holding a portion of said nutrient solution in said growth chamber;
a middle bucket, of a size fitting within said lowermost bucket above said open space at the bottom of said lowermost bucket, and having an open space at the bottom of said middle bucket constituting a root catcher means for holding roots from said plant without allowing said roots to extend appreciably into said lowermost bucket and also constituting the remaining portion of said growth chamber reservoir means;
an upper bucket, of a size fitting within said middle bucket, containing plant media and said plant;
means, connected to said conveyance means and extending to the top of said plant media in said upper bucket, for allowing flow of said nutrient solution from said conveyance means to the top of said plant media; and
drainage means for allowing drainage of said nutrient solution from said upper bucket to said growth chamber reservoir means in the bottom of said lowermost bucket.
6. A hydroponic plant growth apparatus, comprising:
a reservoir;
a distribution chamber operably connected to said reservoir; and
at least one plant growth chamber operably connected to said distribution chamber, said plant growth chamber comprising:
a lower bucket;
a middle bucket, at least a portion of said middle bucket being within said lower bucket, said middle bucket having at least one hole in a lower portion thereof; and
an upper bucket, at least a portion of said upper bucket being within said middle bucket, said upper bucket having at least one hole in a lower portion thereof.
7. The apparatus of claim 6 wherein said at least one plant growth chamber is operably connected to said distribution chamber by a first tube and by a second tube disposed within said first tube.

8. The apparatus of claim 7 wherein said first tube is a return flow tube and said second tube is a feed tube.
9. The apparatus of claim 6 wherein said plant growth chamber is operably connected to said distribution chamber by a feed tube, said feed tube passing through an opening in said lower bucket, through an opening in said middle bucket and through an opening in said upper bucket.
10. The apparatus of claim 9 further comprising a pipe, at least a portion of said pipe being disposed within said upper bucket, and said feed tube passing within said pipe.
11. The apparatus of claim 6 wherein said reservoir comprises:
an upper bucket;
a lower bucket;
a float valve disposed in said lower bucket of said reservoir, said float valve admitting nutrient solution from said upper bucket of said reservoir to said lower bucket of said reservoir when a level of said nutrient solution in said lower bucket of said reservoir falls below a desired height.
12. The apparatus of claim 6 wherein said distribution chamber comprises:
a container;
a pump disposed within said container; and
a distributor connected to said pump;
said at least one plant growth chamber being operably connected to said distribution chamber by a feed tube extending from said distributor, through an opening in said container, and within a return flow tube to said at least one plant growth chamber.
13. A hydroponic plant growth apparatus, comprising:
a reservoir comprising an upper bucket, a lower bucket, and a float valve disposed in said lower bucket, said float valve admitting nutrient solution from said upper bucket of said reservoir to said lower bucket of said reservoir when a level of said nutrient solution in said lower bucket of said reservoir falls below a desired height;
a distribution chamber operably connected to said reservoir; and
at least one plant growth chamber operably connected to said distribution chamber.
14. The apparatus of claim 13, wherein a tube connects said upper bucket of said reservoir and said lower bucket of said reservoir, and wherein said float valve permits said nutrient solution to flow from said upper bucket of said reservoir, through said tube and to said lower bucket of said reservoir when a level of said nutrient solution in said lower bucket of said reservoir falls below a desired height.
15. A hydroponic plant growth apparatus, comprising:
a reservoir;
a distribution chamber operably connected to said reservoir;
at least one plant growth chamber;
a first tube extending between said distribution chamber and said at least one plant growth chamber; and
a second tube extending between said distribution chamber and said at least one plant growth chamber, said second tube being disposed within said first tube.
16. The apparatus of claim 15 wherein said first tube is a return flow tube and said second tube is a feed tube.

* * * * *